US012619491B2

(12) United States Patent
Kim et al.

(10) Patent No.: US 12,619,491 B2
(45) Date of Patent: May 5, 2026

(54) DISPLAY PROCESSING DEVICE, A DATA TRANSMISSION METHOD, AND AN IMAGE DATA INSPECTION METHOD

(71) Applicant: LX SEMICON CO., LTD., Daejeon (KR)

(72) Inventors: Man Jung Kim, Daejeon (KR); Bong Sin Kwak, Daejeon (KR); Myung Yu Kim, Daejeon (KR); Kwang Hee Yoon, Daejeon (KR); Seok Jin Jeong, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/617,207

(22) Filed: Mar. 26, 2024

(65) Prior Publication Data

US 2024/0330106 A1 Oct. 3, 2024

(30) Foreign Application Priority Data

Mar. 27, 2023 (KR) ........................ 10-2023-0039893

(51) Int. Cl.
*G06F 11/10* (2006.01)
*G09G 5/00* (2006.01)
(52) U.S. Cl.
CPC ......... *G06F 11/1004* (2013.01); *G09G 5/006* (2013.01); *G09G 2370/04* (2013.01)

(58) Field of Classification Search
CPC ........ H04L 1/0061; G09G 5/00; G09G 5/006; G09G 3/006; G09G 3/2096; G09G 3/20; G06F 11/004; G06F 11/1004
See application file for complete search history.

(56) References Cited

U.S. PATENT DOCUMENTS

| | | | |
|---|---|---|---|
| 2007/0011588 A1 | 1/2007 | Shiung | |
| 2007/0286246 A1* | 12/2007 | Kobayashi | ............. G09G 5/006 370/522 |
| 2013/0235055 A1 | 9/2013 | Kim et al. | |
| 2019/0013826 A1* | 1/2019 | Kikuta | ................... H04N 7/183 |
| 2020/0050520 A1 | 2/2020 | Ogawa | |

FOREIGN PATENT DOCUMENTS

KR 10-1158876 B 6/2012

OTHER PUBLICATIONS

Extended European Search Report dated May 15, 2024, issued for the corresponding European patent application No. 24166147.9, 13 pages.

* cited by examiner

*Primary Examiner* — Shelly A Chase
(74) *Attorney, Agent, or Firm* — ROTHWELL, FIGG, ERNST & MANBECK, P.C.

(57) ABSTRACT

Embodiments are related to a display processing device, a data transmission method, and an image data inspection method, and provide a device and method for checking whether image data transmitted through a transmission line has errors.

18 Claims, 13 Drawing Sheets

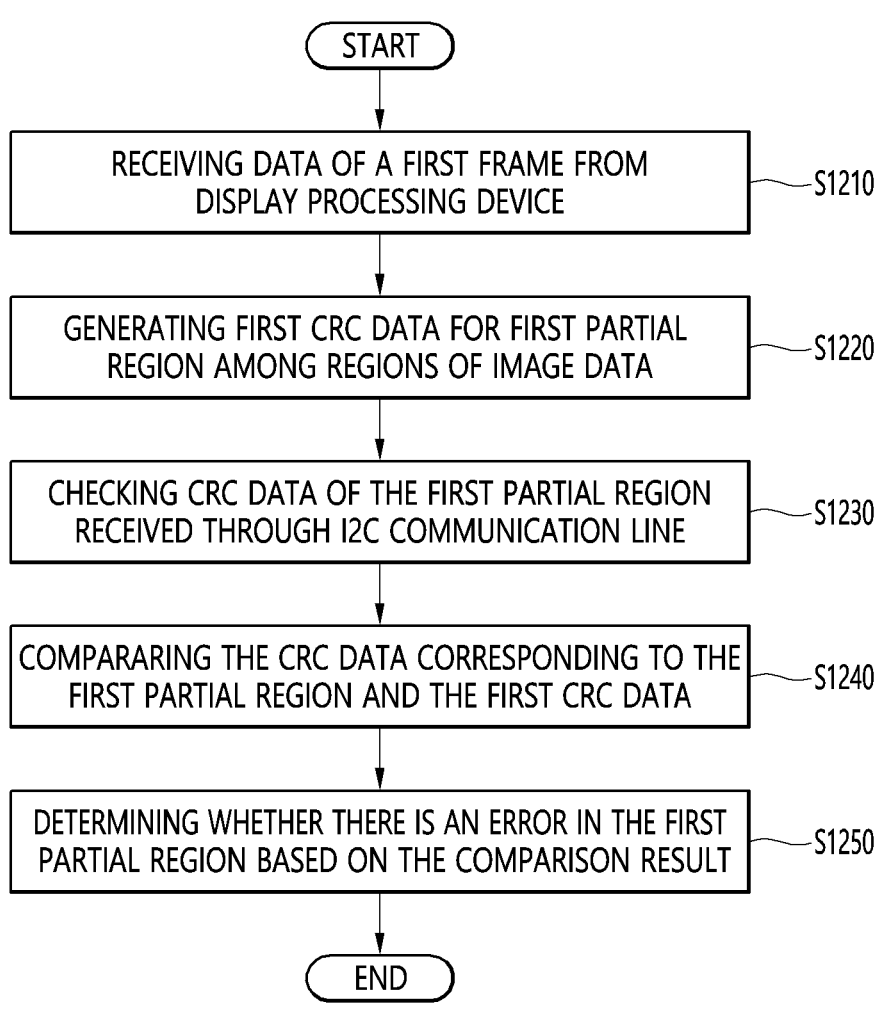

START

RECEIVING DATA OF A FIRST FRAME FROM
DISPLAY PROCESSING DEVICE ——S1210

GENERATING FIRST CRC DATA FOR FIRST PARTIAL
REGION AMONG REGIONS OF IMAGE DATA ——S1220

CHECKING CRC DATA OF THE FIRST PARTIAL REGION
RECEIVED THROUGH I2C COMMUNICATION LINE ——S1230

COMPARARING THE CRC DATA CORRESPONDING TO THE
FIRST PARTIAL REGION AND THE FIRST CRC DATA ——S1240

DETERMINING WHETHER THERE IS AN ERROR IN THE FIRST
PARTIAL REGION BASED ON THE COMPARISON RESULT ——S1250

END

DISPLAY PROCESSING DEVICE, A DATA TRANSMISSION METHOD, AND AN IMAGE DATA INSPECTION METHOD

CROSS-REFERENCE TO RELATED APPLICATIONS

The present application claims the benefits of priority to Korean Patent Application No. 10-2023-0039893, filed on Mar. 27, 2023 in the Republic of Korea, the entire contents of which are hereby expressly incorporated by reference into the present application.

BACKGROUND OF THE DISCLOSURE

Embodiments are related to a display processing device, a data transmission method, and an image data inspection method.

The display panel is composed of a number of pixels arranged in a matrix, and each pixel can be composed of subpixels such as red (R), green (G), and blue (B). Each subpixel can display an image on the display panel while emitting light in a grayscale corresponding to video data (or image data).

The video data can be transmitted from a host (e.g., graphic processing unit (GPU)) to a timing controller. The video data can be transferred from the timing controller to the source driver. At this time, the device transmitting the video data can be referred to as a display processing device for convenience, and the device receiving the video data can be referred to as a display driving device for convenience. For example, the video data can be transmitted as a digital value, and the source driver can convert the video data transmitted as a digital value into an analog voltage to drive each subpixel.

Meanwhile, as a display device becomes larger and has higher resolution, high performance is also required for interfaces for transmitting signals between a video source (e.g., host) and the display device. In response to these demands, Vx1 is being applied to TVs, and display port (hereinafter referred to as 'DP') is being applied to IT product such as laptop.

The DP interface is an interface defined by the Video Electronics Standards Association (VESA), and is an interface method that integrates a low voltage differential signaling (LVDS), an internal interface standard, and a digital visual interface (DVI), an external connection standard to connect them as one. The DP interface is a technology that can digitally connect not only the internal connections between chips, but also the external connections between products.

By combining the two interfaces, namely the LVDS interface and the DVI interface, into one, the data bandwidth can be expanded to support higher color depth and resolution. For example, the DP interface can have a bandwidth of up to 10.8 Gbps, which is more than twice that of DVI (up to 4.95 Gbps). For example, the DP interface supports multiple streams with a micro-packet architecture, allowing up to six 1080i streams (three 1080p) to be transmitted simultaneously through a single connector. VESA announced a new version of the embedded Display Port (hereinafter referred to as 'eDP') standard. The eDP standard is an interface standard corresponding to the DP interface designed for devices with built-in display devices such as laptop PCs, tablets, netbooks, and all-in-one desktop PCs. Meanwhile, the vehicle display applied to the vehicle can display maps, the gear status, the turn signal status, the vehicle status, etc. The vehicle display can display values obtained from various sensors in the vehicle. For example, the vehicle display can display the front/rear/side vehicle location, the location of pedestrians, the location of obstacles, etc. In this way, the content displayed on the vehicle display can comprise information that has a critical impact on the safety of the vehicle. Therefore, if the driver perceives the condition of the car or its surroundings based on incorrect content or information displayed on the car display, a car accident can occur.

Therefore, there is a need for a method that can check errors in information displayed on the vehicle display.

SUMMARY OF THE DISCLOSURE

Against this background, one object of the embodiment is to provide a display processing device, a data transmission method, and an image data inspection method that can check errors in data in important areas among information displayed on a display (e.g., vehicle display).

Another object of the embodiment is to provide a display processing device, a data transmission method, and an image data inspection method that can selectively transmit cyclic redundancy check (CRC) data for data in important areas of information displayed on a display (e.g., vehicle display) through a separate communication line (e.g., an inter-integrated circuit (I2C) communication line).

In order to achieve the above or other objects, according to one aspect of the embodiment, a data transmission method of a display processing device, comprising: generating cyclic redundancy check (CRC) data for a first partial region of regions of image data included in a first frame; transmitting data of the first frame through a first communication line; and transmitting address information corresponding to the first partial region and CRC data for the first partial region through a second communication line.

According to another aspect of the embodiment, a method for inspecting image data of a display driving device, comprising: receiving data of a first frame through a first communication line; receiving cyclic redundancy check (CRC) data for a first partial region among regions of image data included in the first frame and address information corresponding to the first partial region through a second communication line; generating first CRC data for the first partial region included in the received data of the first frame; and determining whether there is an error in the first partial region based on a comparison result between the generated first CRC data and the received CRC data.

According to another aspect of the embodiment, a display processing device, comprising: frame data transmission circuit configured to transmit data of a first frame through a first communication line; a cyclic redundancy check (CRC) generation circuit configured to generate CRC data for a first partial region among regions of image data included in the first frame; and a CRC transmission circuit configured to transmit address information corresponding to the first partial region and CRC data for the first partial region through a second communication line.

As described above, according to the embodiments, errors in data in important areas among information displayed on a display (e.g., vehicle display) can be checked.

According to the embodiments, CRC data for data in important areas among information displayed on a display (e.g., vehicle display) can be selectively transmitted through a separate communication line (e.g., I2C communication line).

BRIEF DESCRIPTION OF THE DRAWINGS

FIG. 8B is a diagram showing the configuration of CRC data according to an embodiment.

FIG. 12 is a circuit diagram of an image data inspection method according to an embodiment.

DETAILED DESCRIPTION OF EMBODIMENTS

Figure 1:
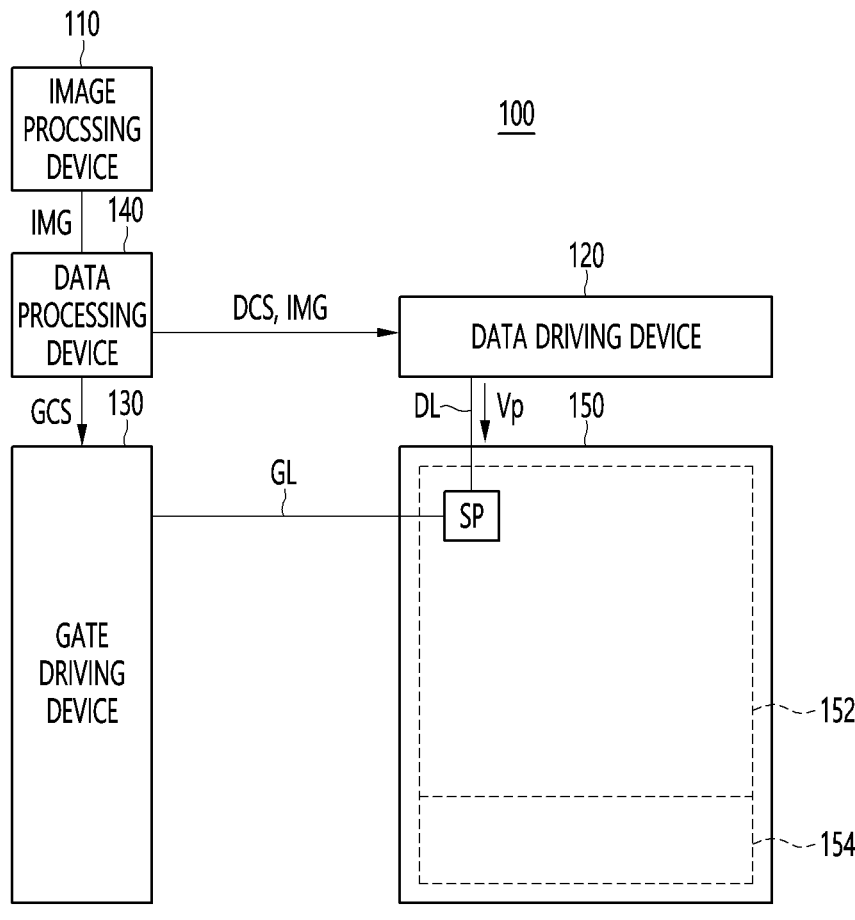
FIG. 1 is a configuration diagram of a display device according to an embodiment.

Hereinafter, embodiments are described in detail through exemplary drawings. When adding reference numerals to components in each drawing, it should be noted that the same reference numerals are assigned to the same components as much as possible even if they are shown in different drawings. Additionally, in describing this disclosure, if it is determined that a detailed description of a related known configuration or function can obscure the gist of this disclosure, the detailed description will be omitted.

Additionally, in describing the components of this disclosure, terms such as first, second, A, B, (a), (b), etc. can be used. The use of these terms is only to distinguish the component from other components, and the nature, or order of the component is not limited by the term. When a component is described as being "coupled," or "connected" to another component, that component can be directly connected or coupled to that other component. However, it should be noted that another component can be "coupled," or "connected" between each component.

FIG. 1 is a configuration diagram of a display device according to an embodiment.

Referring to FIG. 1, the display device 100 can comprise a plurality of panel driving devices (or panel driving circuits) 110 to 140 and a display panel 150.

A plurality of data lines DL, a plurality of gate lines GL and a plurality of pixels can be disposed on the display panel 150. A pixel can be composed of a plurality of subpixels SP. Here, one subpixel can comprise a red subpixel, a green subpixel, a blue subpixel, a white subpixel, etc. For example, one pixel can be composed of RGB subpixels, RGBG subpixels, or RGBW subpixels. Hereinafter, for convenience of explanation, one pixel will be described as consisting of RGB subpixels.

The panel driving devices 110 to 140 can be devices that generate signals for displaying video on the display panel 150. The panel driving devices 110 to 140 comprise an image processing device (or image processing circuit) 110, a data driving device (or data driving circuit) 120, and a gate driving device (or gate driving circuit) 130, and a data processing device (or data processing circuit) 140, etc.

The gate driving device can supply a gate driving signal (or scan signal) of turn-on voltage or turn-off voltage to the gate line GL. When the gate driving signal of the turn-on voltage is supplied to the subpixel SP, the subpixel SP can be connected to the data line DL. When the gate driving signal of the turn-off voltage is supplied to the subpixel SP, the connection between the subpixel SP and the data line DL can be disconnected. The gate driving device 130 can be referred to as a gate driver.

The data driving device 120 can supply data voltage Vp to the subpixel SP through the data line DL. The data voltage Vp supplied to the data line DL can be supplied to the subpixel SP. The data driving device 120 can be referred to as a source driver.

The data driving device 120 can comprise at least one integrated circuit. The at least one integrated circuit can be connected to a bonding pad of the display panel 150 using a tape automated bonding (TAB) type or a chip on glass (COG) type, or can be formed directly on the display panel 150. According to on the embodiment, the at least one integrated circuit can be integrated into the display panel 150. The data driving device 120 can be implemented as a chip-on-film (COF) type.

When the data driving device 120 is formed as a chip-on-glass type, the integrated circuits constituting the data driving device 120 can be formed in a peripheral area 154 of an active area 152 where the subpixel SP is disposed. In order to maximize a size of the active area 152 of the display panel 150, the size of the peripheral area 154 can be reduced and the chip size of the integrated circuits constituting the data driving device 120 can be reduced.

The data processing device 140 can supply control signals to the gate driving device 130 and the data driving device 120. For example, the data processing device 140 can transmit a gate control signal GCS for scan driving to the gate driving device 130. The data processing device 140 can output video data IMG to the data driving device 120. The data processing device 140 can transmit a data control signal DCS to the data driving device 120. The data control signal DCS can be a signal that controls supply of the data voltage Vp to each subpixel SP. The data processing device 140 can be referred to as a timing controller (or T-CON).

The image processing device 110 can generate video data IMG and transmit the video data IMG to the data processing device 140. The image processing device 110 can be referred to as a host. For example, the image processing device 110 can comprise a graphic processing unit (GPU).

The data processing device 140 can comprise at least one data processing circuit implemented in the form of an integrated circuit. The data driving device 120 can comprise at least one data driving circuit implemented in the form of an integrated circuit. A high-speed communication interface can be provided between the data processing device 140 and the data driving device 120. The data processing device 140 can transmit the data control signal DCS and/or the video data IMG to the data driving device 120 through a high-speed communication interface.

Figure 2:
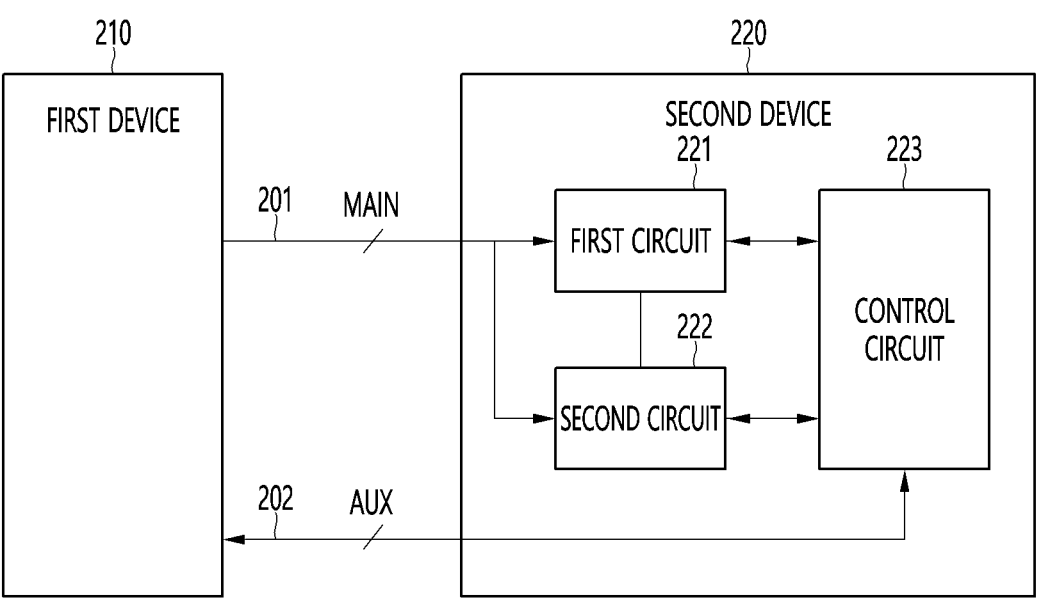
FIG. 2 is a configuration diagram of a data communication system according to an embodiment.

FIG. 2 is a configuration diagram of a data communication system according to an embodiment.

Referring to FIGS. 1 and 2, the data communication system can comprise a first device 210 and a second device 220. The first device 210 can transmit data (e.g., video data IMG) to the second device 220 through the main line (or main transmission line) 201. The first device 210 can be referred to as a data transmission device, and the second device 220 can be referred to as a data reception device. The second device 220 can comprise a first circuit 221, a second circuit 222, a control circuit 223, etc.

According to the embodiments, when the video data IMG is transmitted from the image processing device 110 to the data processing device 140, the image processing device 110 can correspond to the first device 210 and the data processing device 140 can correspond to the second device 220. Additionally, when video data IMG is transmitted from the data processing device 140 to the data driving device 120, the data processing device 140 can correspond to the first device 210, and the data driving device 120 can correspond to the second device 220.

According to the embodiment, the first device 210 and the second device 220 can be connected through at least one main line 201, at least one auxiliary line (AUX) 202, etc. Although not shown in FIG. 2, the first device 210 and the second device 220 can be connected through at least one clock line. According to the embodiment, when the clock signal is transmitted through the main line 201, the clock line can be omitted. For example, the main line 201 is composed of a differential signal line, and data comprising a clock signal can be transmitted through the main line 201. In this instance, a signal comprising a clock signal can be referred to as a clock-embedded differential signal (CEDS), but embodiments described later are not limited thereto term.

According to the embodiment, an auxiliary signal (or control signal) can be transmitted through the auxiliary line 202. When an auxiliary signal (or control signal) is transmitted through the main line 201 without a separate auxiliary line, it can be referred to as AUX-less communication, but embodiments described later are not limited thereto term.

According to the embodiment, the auxiliary signal (or control signal) can be, for example, a signal indicating the state of the second device 220 (or the first circuit 221). When the auxiliary signal has a voltage of a first level, the second device 220 can indicate a state in which data can be received. When the auxiliary signal has a voltage of a second level, the second device 220 can indicate a state in which it is difficult to receive data. Here, the first level and the second level can have different voltages. The auxiliary signal can be referred to as a lock signal. In the phase-locked loop (PLL) method, the side that receives data can comprise a process of adjusting the phase of the clock to the communication signal. When the clock phases are synchronized, the lock signal can change. For example, the lock signal can change from a low level to a high level, or from a high level to a low level.

In the embodiments, a lock signal can be transmitted through the auxiliary line 202. In addition to indicating whether the clock phase is synchronized, the lock signal can also indicate other states of the second device 220. For example, when the lock signal changes from high level to low level, it can indicate that the second device 220 is in a difficult state to receive data or can indicate that the communication signal transmitted to the second device 220 is abnormal.

According to the embodiment, a clock pattern can be transmitted to the clock line or main line 201. For example, the clock pattern can indicate the bit unit of data transmitted through the main line 201 (e.g., ML1, ML2, . . . , MLn). The second device 220 can recognize the received data in bit units according to the clock pattern. For example, the second device 220 can receive the clock pattern through the main line 201 and train a communication clock according to the clock pattern. The second device 220 can receive data transmitted through the main line 201 in accordance with the communication clock.

According to the embodiment, the clock line may not be used as described above. In this instance, the clock pattern can be embedded in the data transmitted through the main line 201. This clock pattern can be referred to as an embedded clock. According to the embodiment, low voltage and high frequency communication signal can be transmitted through the main line 201. The main line 201 can be a pair of two lines (e.g., a positive line and a negative line). The two-paired lines can transmit communication signals using differential signal transmission method.

According to the embodiment, data (e.g., video data) can be transmitted through the main line 201. The data can comprise information and/or patterns. For example, the information can be setting data, video data, etc. transmitted through the main line 201. The setting data can comprise information about various setting values required for operation of the second device 220. The video data can comprise information about the grayscale value of each pixel. The setting data can comprise a data control signal (DCS in FIG. 1), and the video data can be video data (IMG in FIG. 1).

According to the embodiment, training data (or link data) transmitted through the main line 201 can be configured to comprise a set pattern. Here, the pattern can indicate the temporal rules of the signal. The first device 210 and the second device 220 can exchange data without being synchronized with each other due to a delay, etc. on the main line 201. For data transmission and reception in this asynchronous state, the second device 220 can train a data link using training data and receive setting data, video data IMG, etc. according to the trained data link. The training data (or link data) can be transmitted and received for training of the data link, but in embodiments, the training data can be transmitted and received to indicate one information.

According to the embodiment, the first circuit 221 of the second device 220 can receive and process data transmitted from the first device 210 through the main line 201 (e.g., differential signal line). The second circuit 222 of the second device 220 can receive and process a control signal transmitted from the first device 210 through the main line 201 (e.g., differential signal line). The control signal processed by the second circuit 222 of the second device 220 can comprise a signal for controlling the first circuit 221. For example, the control signal processed by the second circuit 222 of the second device 220 can comprise a signal for controlling the power supplied to the first circuit 221 (e.g., a signal for blocking or reducing power).

According to the embodiment, the control circuit 223 can control the power supplied to the first circuit 221 based on the control signal processed through the second circuit 222, that is, for example, block or reduce the power.

According to the embodiments, when data (e.g., video data IMG) transmitted from the first device 210 is received by the second device 220, there can be a temporary period of inactivity in the stream in which data is not transmitted. The control circuit 223 can block or reduce the power supplied to the first circuit 221 to reduce power consumption during a period in which data is not transmitted. For example, a mode for blocking or reducing power supplied to the first circuit 221 can be referred to as a low-power mode, but various embodiments are not limited thereto term.

The first device 210 can transmit a control signal through the main line 201 to control the mode of the first circuit 221 included in the second device 220. The control signal transmitted through the main line 201 can be processed in the second circuit 222 of the second device 220.

The signal for switching the mode again in order for the first circuit 221 to receive data while the power supply of the first circuit 221 is limited can be referred to as a wake-up signal, but various embodiments are not limited to the above term. A signal for switching to a low-power mode as a temporary period of inactivity in the stream is entered in a state where power is normally supplied to the first circuit 221 can be referred to as a sleep signal, but various embodiments are not limited to the above term. The function of managing power by controlling the mode of the second device 220 that receives data in this way can be referred to as advanced link power management (ALPM), but various embodiments are not limited thereto term.

According to the embodiment, although not shown in FIG. 2, an I2C communication line can be connected between the first device 210 and the second device 220. According to the embodiments, the first device 210 and the second device 220 can communicate with each other using a DP interface, an eDP interface, or a high-definition multimedia interface (HDMI). Hereinafter, with reference to FIG. 3, the embodiments of communication between the first device 210 and the second device 220 using the eDP interface and/or I2C interface will be described, but the embodiments described later are not limited thereto.

Figure 3:
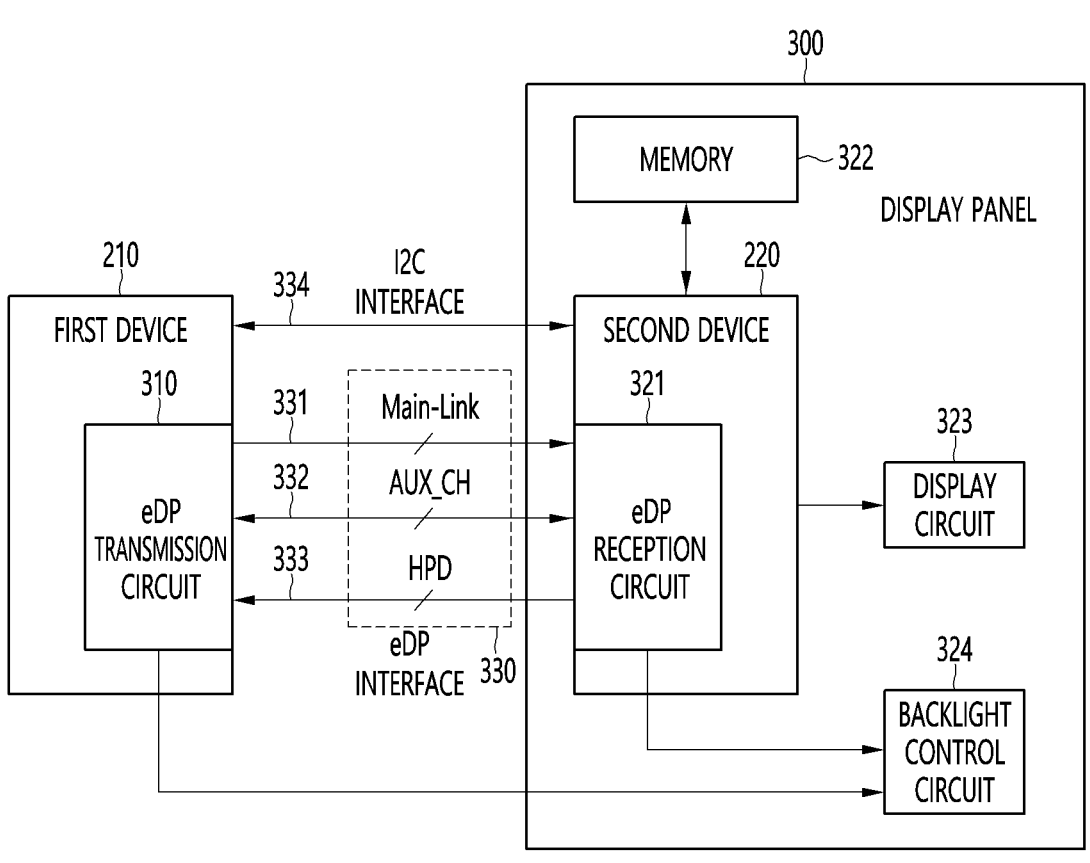
FIG. 3 is a configuration diagram of a data communication system according to an embodiment.

FIG. 3 is a configuration diagram of a data communication system according to an embodiment.

Referring to FIG. 3, the data communication system according to the embodiment can comprise a first device 210 and a second device 220. He first device 210 can comprise an eDP transmission circuit 310 to communicate with the second device 220 using an eDP interface 330. The second device 220 can comprise an eDP reception circuit 321 to communicate with the first device 210 using the eDP interface 330. The first device 210 can be referred to as a source device, and the second device 220 can be referred to as a sink device. The eDP transmission circuit 310 can be referred to as a source device functional unit, and the eDP reception circuit 321 can be referred to as a sink device functional unit.

According to the embodiment, the second device 220 can be included in a display panel 300 (or a display device), but is not limited thereto. For example, the display panel 300 can comprise the second device 220, a memory 322, a display circuit 323, a backlight control circuit 324, etc. The eDP transmission circuit 310 included in the first device 210 can be integrated into the image processing device 110, for example, GPU, as described above. The eDP reception circuit 321 included in the second device 220 can be integrated into the data processing device (140 in FIG. 1) (e.g., timing controller).

According to the embodiment, the eDP interface 330 can comprise a main link (Main-Link) 331, an auxiliary line (AUX_CH) 332, a hot plug detect (HPD) line 333, etc. The HPD line 333 can be a signal line for the first device 210 to detect the connection of the eDP interface 330 with the second device 220. For example, when the first device 210 and the second device 220 are connected by using the HPD line 333, the first device 210 can detect a connection to the eDP interface 330 with the second device 220 and prepare for communication with the second device 220 using an eDP protocol.

Figure 5:
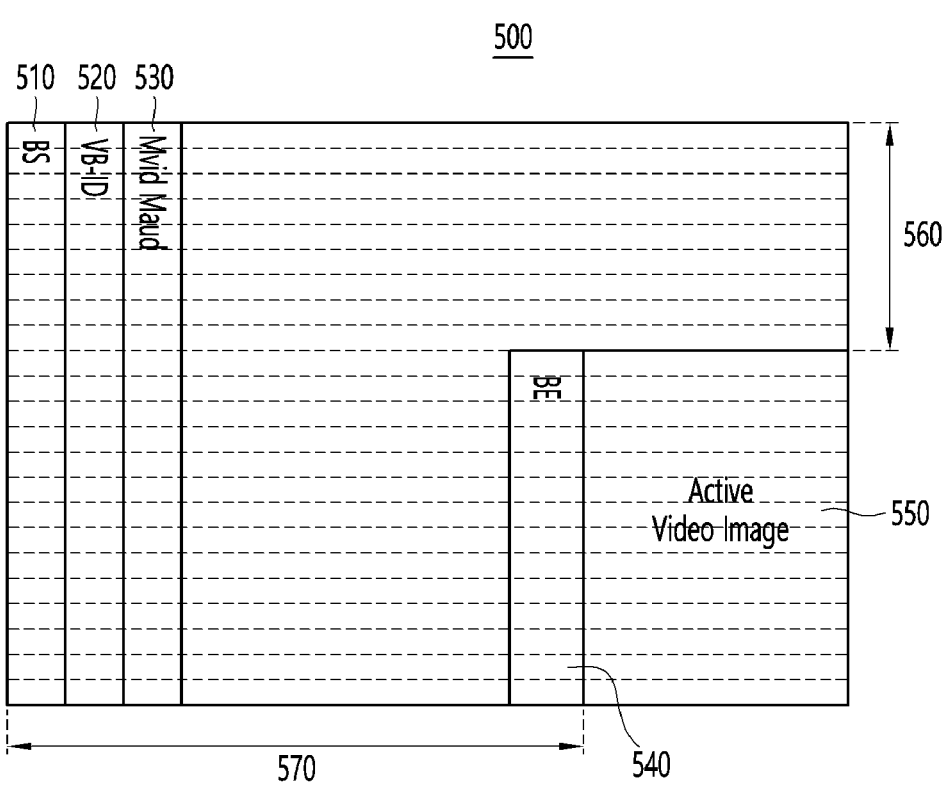
FIG. 5 is a diagram showing the structure of frame data according to an embodiment.

The auxiliary line 332 can transmit and receive various setting information for eDP communication between the first device 210 and the second device 220. The first device 210 can determine whether the second device 220 is capable of communication based on the signal detected through the auxiliary line 332. In addition, the eDP transmission circuit 310 of the first device 210 can transmit mode change information through the auxiliary line 332 so that the main link 331 can operate in a low power mode. According to the embodiment, the first device 210 can transmit image data through the main link 331, and can transmit data defined in the form of a frame as shown in FIG. 5, which will be described later.

According to the embodiments, a display ID or extended display ID (EDID) for specific panel settings can be stored in the memory 322 included in the display panel 300. The first device 210 can check the display ID or EDID stored in the memory 322 using the auxiliary line 332 of the eDP interface 330. The eDP transmission circuit 310 or the eDP reception circuit 321 can transmit a backlight control signal to the backlight control circuit 324. The backlight control circuit 324 can control dimming of the backlight based on the backlight control signal received through the eDP transmission circuit 310 or the eDP reception circuit 321.

According to the embodiment, the second device 220 can receive image data for display from the first device 210 through the main link 331 of the eDP interface 330. The image data received from the second device 220 can be transmitted to the display circuit 323. The display circuit 323 can convert digital image data received from the second device 220 into an analog signal and supply the analog signal to each pixel (or subpixel SP). For example, the display circuit 323 can be a data driving device (120 in FIG. 1), but is not limited thereto.

According to the embodiment, an I2C communication line 334 can be further connected between the first device 210 and the second device 220. The first device 210 can transmit CRC data for image data (or a partial region of image data) to the second device 220 through the I2C communication line 334. For example, the first device 210 can transmit the image data to the second device 220 through the main link 331, and can transmit CRC data for the image data (or a partial region of the image data) to the second device 220 through the I2C communication line 334. A detailed description of the embodiments will be described later.

Figure 4:
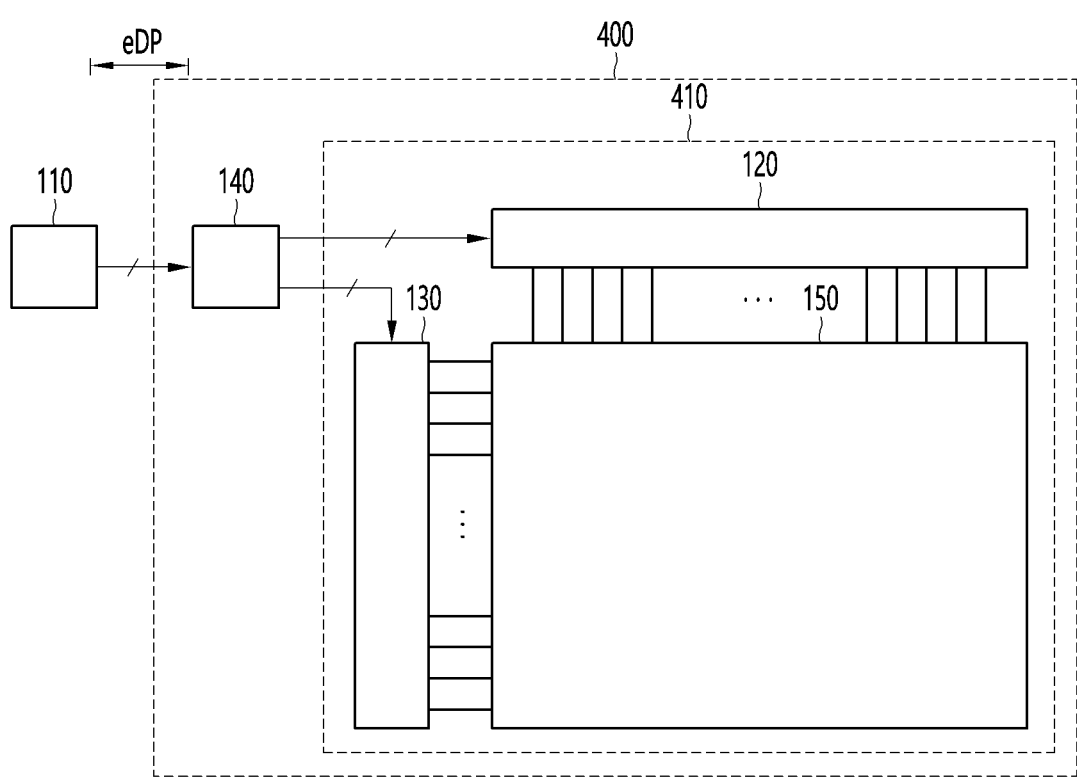
FIG. 4 is a configuration diagram of a display device according to an embodiment.

FIG. 4 is a configuration diagram of a display device according to an embodiment.

Referring to FIGS. 3 and 4, a display device according to an embodiment can comprise a source unit (e.g., image processing device 110) and a sink unit 400. Hereinafter, the source unit and the image processing device are given the same reference numeral 140. The source unit 110 can indicate a system and can comprise the eDP transmission circuit 310. The sink unit 400 can indicate a panel unit and can comprise the data processing device 140 (e.g., timing controller) and a display unit 410. The data processing device 140 can comprise the eDP reception circuit 321 as described above. The source unit 110 and the sink unit 400 can communicate with each other through the eDP interface 330.

The source unit 110 can transmit video data (or image data) to the data processing device 140 included in the sink unit 400 through the eDP transmission circuit 310. The data processing device 140 can receive the video data through the eDP reception circuit 321 and transmit the received video data to the display unit 410. The data processing device 140 can generate timing control signals for controlling the operation timing of driving circuits (e.g., data driving device 120, gate driving device 130, etc.) included in the display unit 410.

A mini-LVDS interface can be provided for data transmission between the data processing device 140 and the data driving device 120, but is not limited thereto. According to the embodiments, the display unit 410 can comprise a display panel 150, a data driving device 120, a gate driving device 130, etc. Since the detailed configuration of the display unit 410 is described in FIG. 1, detailed description will be omitted.

FIG. 5 is a diagram showing the structure of frame data according to an embodiment.

Referring to FIG. 5, one frame 500 can comprise a vertical blank period 560, a horizontal blank period 570, image data 550 (e.g., active video image data), etc. The vertical blank period 560 can be composed of horizontal lines in which no image data 550 exists. The vertical blank period 560 can be transmitted in the following order: blank start data (BS) 510, vertical blank ID (VB-ID) 520, video M value, and audio M value (Mvid/Maud) 530. For horizontal lines where image data 550 exists, the image data 550 can be transmitted after the horizontal blank period 570. The horizontal blank period 570 can be transmitted in the following order: BS 510, VB-ID 520, Mvid/Maud 530, and blank end data (BE) 540.

Referring to FIGS. 3 and 5, according to the embodiment, the eDP transmission circuit 310 of the first device 210 can sequentially transmit data corresponding to each horizontal line of the frame 500 to the eDP reception circuit 321 of the second device 220 through the main link 331 of the eDP interface 330.

Figure 6A:
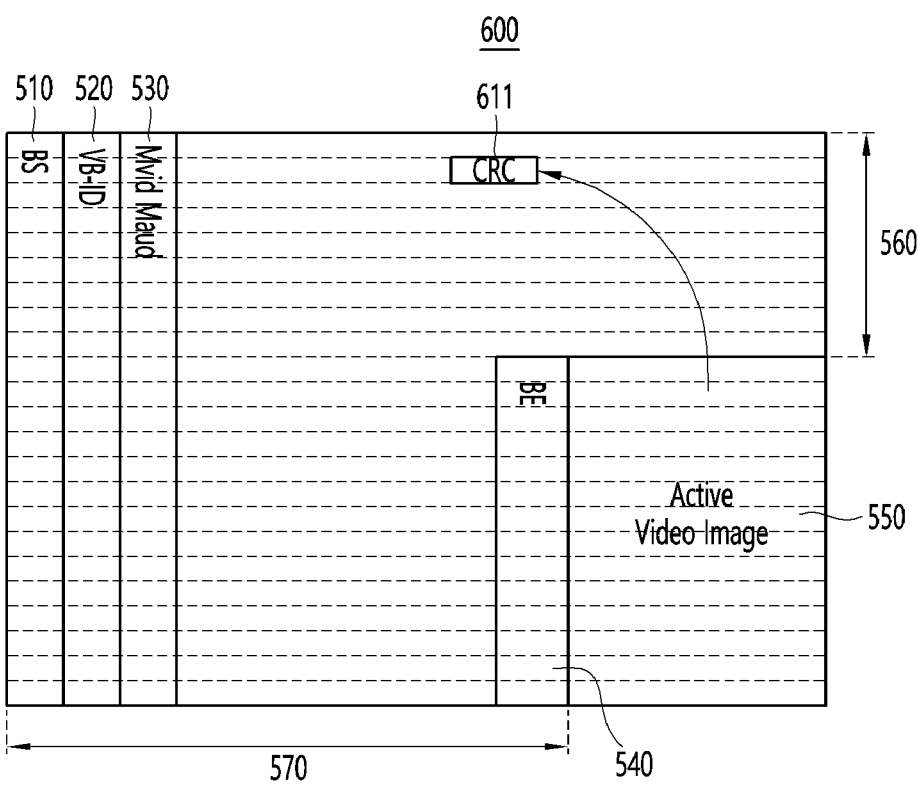
FIG. 6A is a diagram showing the structure of frame data according to an embodiment.

FIG. 6A is a diagram showing the structure of frame data according to an embodiment.

Referring to FIG. 6A, according to the embodiment, one frame 600 can comprise a vertical blank period 560, a horizontal blank period 570, image data 550 (e.g., active video image data), etc. The vertical blank period 560 can comprise CRC data 611. According to the embodiment, the CRC data 611 can be transmitted at a preset location within the vertical blank period 560. The preset location can be defined in the eDP standard document, but is not limited thereto. For example, the CRC data 611 can be transmitted by being included in a video stream configuration secondary-data packet (VSC SDP) defined in the eDP standard document.

According to the embodiments, when transmitting the frame 600, horizontal lines corresponding to the vertical blank period 560 can be transmitted first, and then horizontal lines comprising the horizontal blank period 570 can be transmitted. At this time, a VSC SDP comprising CRC data 611 can be transmitted at a preset location within the vertical blank period 560. Meanwhile, the horizontal blank period 570 can start from BS 510 and end at BE 540 for each horizontal line. Each horizontal line comprising the horizontal blank period 570 can be sequentially transmitted after the BE 540 is transmitted.

According to the embodiments, the CRC data 611 can comprise CRC data for the entire area of the image data 550 included in the frame 600. For example, the CRC data 611 can comprise CRC data for the image data 550 included in the frame 500.

According to the embodiment, since the CRC data 611 constitutes a part of the frame 600, it can be transmitted together when transmitting data of the frame 600. As an example, the CRC data 611 can be transmitted through the main link 331 of the eDP interface 330 along with the image data 550 when transmitting data of the frame 600. As another example, the CRC data 611 can be transmitted through the auxiliary link 332 of the eDP interface 330 along with the image data 550 when transmitting data of the frame 600. As another example, the CRC data 611 can be transmitted through an I2C interface (e.g., the I2C communication line 334 in FIG. 3) together with the image data 550 when transmitting data of the frame 600.

Figure 6B:
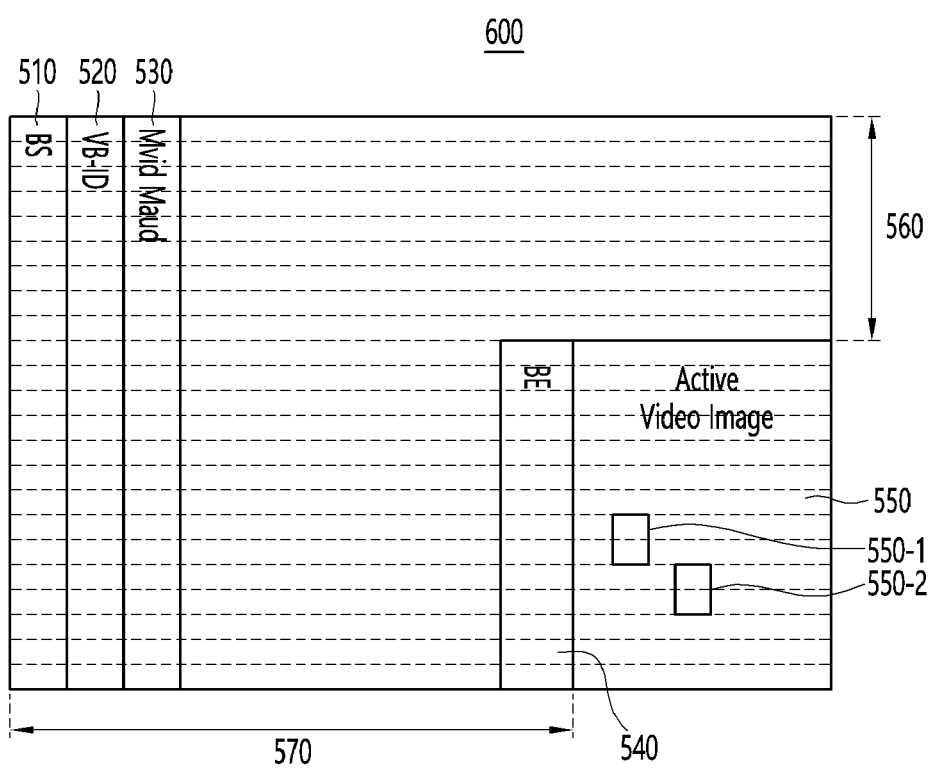
FIG. 6B is a diagram showing the structure of frame data according to an embodiment.

FIG. 6B is a diagram showing the structure of frame data according to an embodiment.

Referring to FIG. 6B, according to the embodiment, one frame 600 can comprise a vertical blank period 560, a horizontal blank period 570, image data 550 (e.g., active video image data), etc.

According to the embodiments, when transmitting the frame 600, horizontal lines corresponding to the vertical blank period 560 can be transmitted first, and then horizontal lines comprising the horizontal blank period 570 can be transmitted. At this time, the horizontal blank period 570 can start from BS 510 and end at BE 540 for each horizontal line. Each horizontal line comprising the horizontal blank period 570 can be sequentially transmitted after the BE 540 is transmitted.

According to the embodiment, a first partial region 550-1 and a second partial region 550-2 can be set among the entire area of the image data 550. The display processing device can generate first CRC data for the first partial region 550-1 and second CRC data for the second partial region 550-2, and transmit the generated first CRC data and/or second CRC data to the display driving device through the I2C interface (e.g., the I2C communication line 334 in FIG. 3).

The drawing illustrates two partial regions 500-1 and 500-2, but one partial region or three or more partial regions can also be set. When the image data 550 is a vehicle display installed in a vehicle, the first partial region 550-1 or the second partial region 550-2 can comprise the map, the gear status, the turn signal status, the vehicle status, and images corresponding to values obtained from various sensors. For example, the first partial region 550-1 or the second partial region 550-2 can comprise images corresponding to the front/back/side vehicle location, the pedestrian location, and the obstacle location.

As an example, the first CRC data for the first partial region 550-1 and the second CRC data for the second partial region 550-2 can comprise data generated by performing a CRC operation on the entirety of each partial region 550-1 and 550-2. As another example, the first CRC data and the second CRC data can comprise data generated by performing a CRC operation only for a specific section in which the image data of each partial region 550-1 and 550-2 is divided into a plurality of sections.

As another example, the first CRC data and the second CRC data can comprise CRC data generated by CRC calculation only for subpixels of a specific color (e.g., R or G or B) in the image data of each partial region 550-1 and 550-2.

Figure 7:
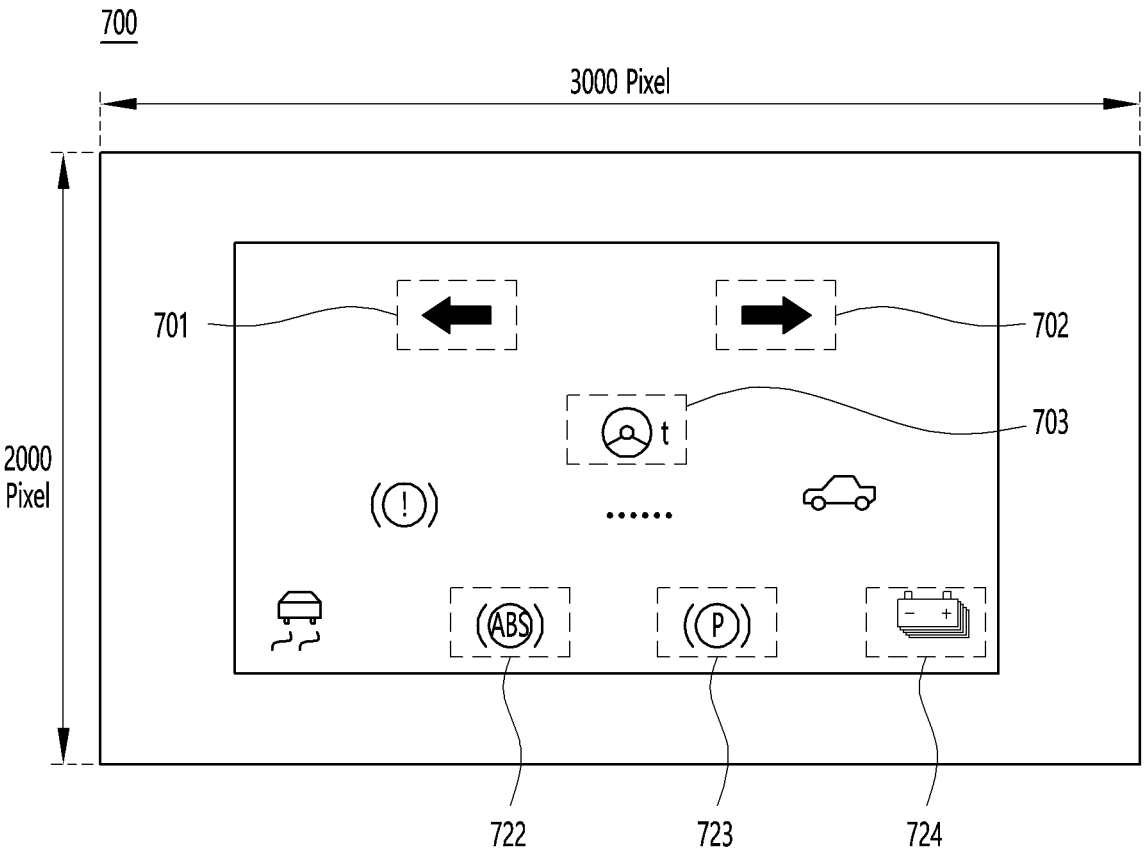
FIG. 7 is a diagram showing an image displayed on a vehicle display according to an embodiment.

FIG. 7 is a diagram showing an image displayed on a vehicle display according to an embodiment.

Referring to FIG. 7, the vehicle display 700 (e.g., instrument panel) can be configured with 3000 pixels horizontally and 2000 pixels vertically, but this is just an example to aid understanding and is not limited to the above numbers. According to an embodiment, images corresponding to a map, the gear status, the turn signal status, the vehicle status, and values obtained from various sensors of the vehicle can be displayed on the vehicle display 700.

According to the embodiment, at least one image among the images displayed on the vehicle display 700 can be set as a partial region. For example, as shown in FIG. 7, among the images displayed on the vehicle display 700, the left turn signal lamp is set to a first partial region 701, the right turn signal lamp is set to a second partial region 702, and the power steering warning light can be set to a third partial region 703. In addition, the ABS warning light can be set to a $22^{nd}$ partial region 722, the parking brake light can be set to a $23^{rd}$ partial region 723, and the battery warning light can be set to a $24^{th}$ partial region 724. FIG. 7 shows that 24 images are set as partial regions, but this is only an example and is not limited to the above numbers. For example, the number of settings for the partial region is not limited to a specific number. According to the embodiment, the first partial region 701 set in FIG. 7 can correspond to the first partial region 550-1 in FIG. 6B, and the second partial region 702 can correspond to the second partial region 550-2 in FIG. 6B.

Meanwhile, one of the partial regions or the entire display area can be damaged for various reasons. For example, noise can occur on the transmission line between the image processing device (110 in FIG. 1) and the data processing device 140, or image data can be damaged due to problems with each device 110 and 140 themselves. Damage to image data is important information due to the characteristics of the vehicle display 700 (e.g., instrument panel) and can pose a direct threat to user safety. In embodiments described later, methods for checking errors in image data using CRC data will be described.

Figure 8A:
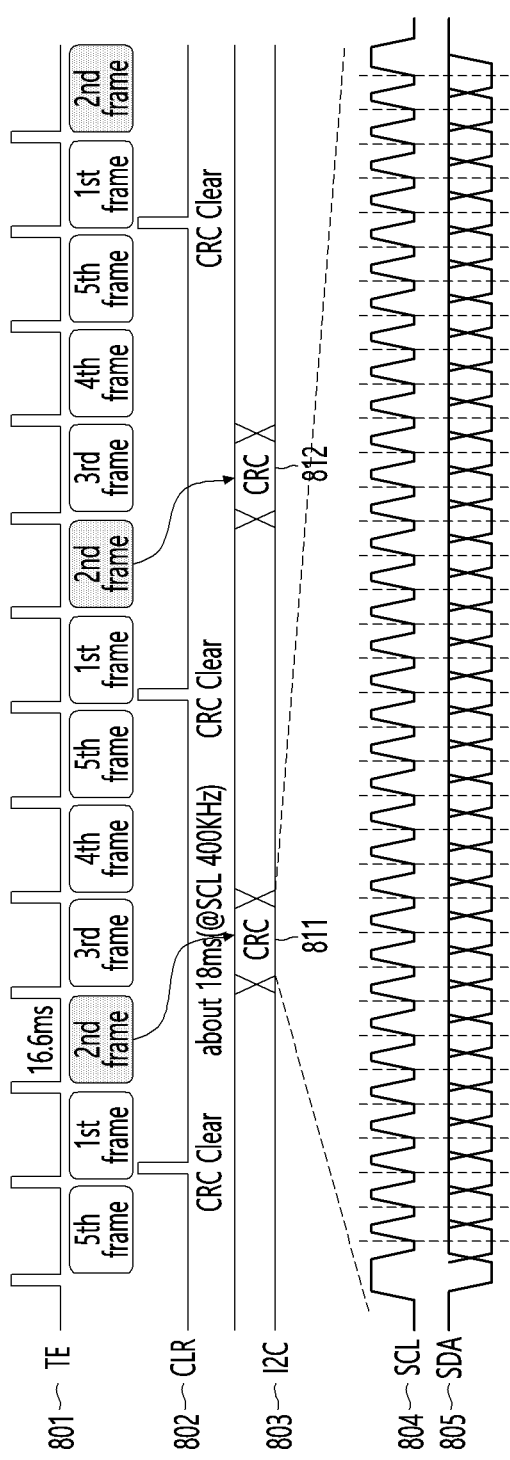
FIG. 8A is a timing diagram showing data transmission according to an embodiment.

FIG. 8A is a timing diagram showing data transmission according to an embodiment.

Referring to FIGS. 7 and 8A, the display processing device can transmit frames containing image data to the display driving device through the main link. Each frame can be transmitted in accordance with a vertical synchronization signal (e.g., a tearing effect output line (TE) signal 801). If the display operates at 60 Hz, one frame can be transmitted over a time period of 16.6 ms.

According to the embodiments, the display processing device can transmit the CRC data 811 and 812 for at least one partial region 701, . . . , 724 among the regions of image data included in each frame to the display driving device through the I2C communication line 803. At this time, the CRC data 811 and 812 can be transmitted at each of set intervals of frames.

For example, FIG. 8A illustrates that CRC data 811 and 812 are transmitted every five frames. The CRC data 811 and 812 can be transmitted corresponding to every second frame from the time of transmission of the CRC clear signal (CLR) 802. The CRC data 811 and 812 generated in the corresponding frame can be processed to be transmitted at the transmission timing of the next frame. FIG. 8A illustrates that CRC data 811 for the second frame is transmitted at the transmission timing of the third frame.

For example, referring to FIG. 8A, the display processing device can transmit the data of the second frame through the main link (e.g., the main link 331 in FIG. 3) and then transmit the CRC data 811 and 812 corresponding to the second frame through the I2C communication line 803 (e.g., the I2C communication line 334 in FIG. 3) at the time of transmitting the third frame data through the main link 331. When the transmission rate of the I2C communication line 803 is set to 400 KHz, each CRC data 811 and 812 can be transmitted during a time interval of 18 ms. Each of the CRC data 811 and 812 can comprise CRC data corresponding to at least one partial region 701, . . . , 724. For example, the CRC data 811 can comprise CRC data corresponding to 24 partial regions 701, . . . , 724, and the CRC data 812 can comprise CRC data corresponding to 24 partial regions 701, . . . , 724.

According to the embodiment, the I2C communication line 803 can comprise a serial clock line (SCL) 804 and a serial data (SDA) line 805. The transmitting side (e.g., display processing device) can output a clock for synchronization through the SCL line 804 of the I2C communication line 803. The receiving side (e.g., a display driving device) can check data through the SDA line 805 in accordance with the clock output to the SCL line 804. At this time, the transmitting side can be referred to as a master (device), and the receiving side can be referred to as a slave (device), but is not limited thereto.

Figure 8B:
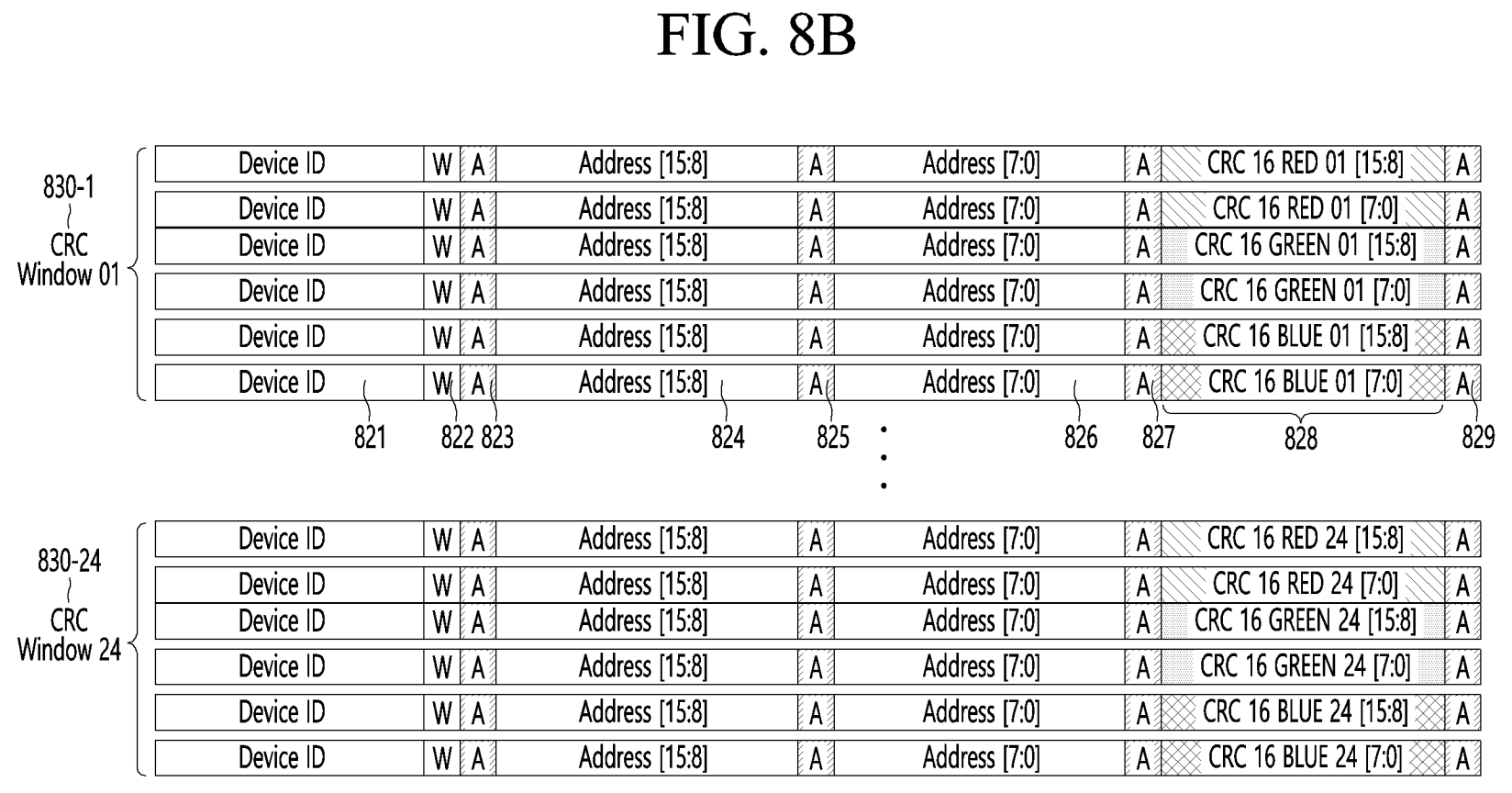

Hereinafter, a detailed configuration example of the CRC data 811 and 812 will be described with reference to FIG. 8B. FIG. 8B is a diagram showing the structure of CRC data according to an embodiment.

Referring to FIGS. 7, 8A, and 8B, each of the CRC data (811 and 812 in FIG. 8A) can comprise CRC data corresponding to each preset partial region 701, . . . , 724. For example, each CRC data 811 and 812 can comprise 24 CRC data 701, . . . , 724. For example, the CRC data 811 can comprise first CRC data 830-1 corresponding to the first partial region 701, and 24th CRC data 830-24 corresponding to the $24^{th}$ partial region 724. The CRC data 812 can comprise first CRC data 830-1 corresponding to the first partial region 701, and $24^{th}$ CRC data 830-24 corresponding to the $24^{th}$ partial region 724.

According to the embodiment, each CRC data 830-1, . . . , 830-24 corresponding to each preset partial region 701, . . . , 724 can be composed of 16 bits, and be configured to fit the format of the I2C communication interface. For example, the first CRC data 830-1 corresponding to the first partial region 701 can comprise 16-bit red CRC data, 16-bit green CRC data, and 16-bit blue CRC data. The $24^{th}$ CRC data 830-24 corresponding to the $24^{th}$ partial region 724 can comprise 16 bits of red CRC data, 16 bits of green CRC data, and 16 bits of blue CRC data.

The 16-bit CRC data for each subpixel can be reconfigured to fit the I2C communication interface format capable of transmitting 8-bit data, as shown in FIG. 8B. For example, 16-bit red CRC data, 16-bit green CRC data, and 16-bit blue CRC data can each be divided into 8-bit data and transmitted twice. In other words, each 8-bit data can be configured to fit the format of the I2C communication interface.

According to the embodiment, the format of the I2C communication interface is a device ID 821, a read/write area 822, a first ACK area 823, a first address area 824, a second ACK area 825, a second address area 826, a third ACK area 827, a CRC data area 828, a fourth ACK area 829, etc.

The device ID 821 can comprise an identification ID of the receiving side (e.g., slave) and can comprise an ID corresponding to a display driving device (e.g., timing controller). The read/write area 822 can indicate whether the data to be transmitted is read data or write data. Each ACK area 823, 825, 827, and 829 can comprise response information indicating that data was normally received on the receiving side.

According to the embodiment, the first address area 824 and/or the second address area 826 can comprise address information (or location information) of a partial region corresponding to the CRC data area 828. The receiving side (e.g., a display driving device) can check the address information (or location information) included in the first address area 824 and/or the second address area 826, and can check the address or location of at least one region 701, 702, . . . , and 724 included in the image data. The receiving side (e.g., a display driving device) can calculate (or generate) CRC data for at least one partial region 701, 702, . . . , 724 based on the address or location of at least one partial region 701, 702, . . . , 724 included in the image data.

The receiving side (e.g., display driving device) can compare the CRC data for each calculated partial region 701, 702, . . . , and 724 with the CRC data area 828 received through the I2C communication interface to check whether there is an error in at least one partial region 701, 702, . . . , and 724.

Figure 9:
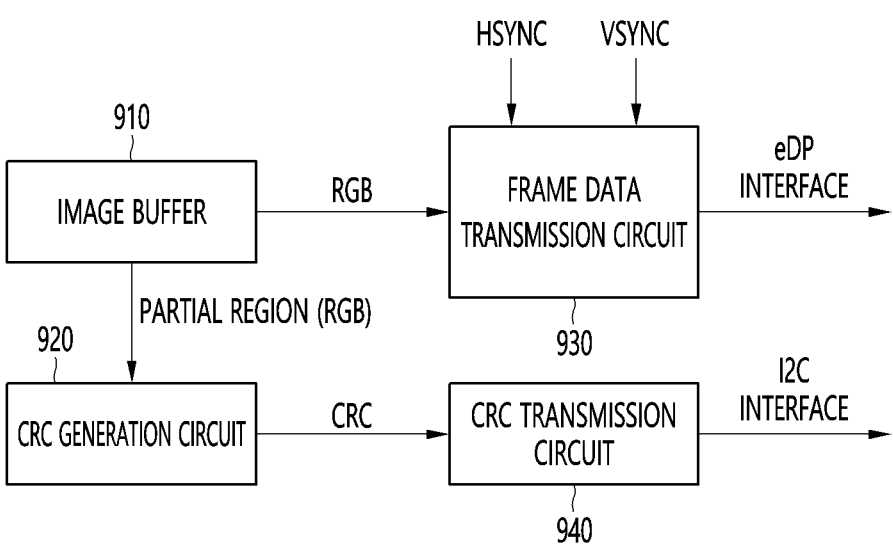
FIG. 9 is a circuit diagram of a data transmission device according to an embodiment.

FIG. 9 is a circuit diagram of a data transmission device according to an embodiment.

Referring to FIG. 9, a data transmission device (e.g., a display processing device) according to an embodiment can comprise an image buffer 910, a CRC generation circuit 920, a frame data transmission circuit 930, and a CRC transmission circuit 940, etc. The image buffer 910 can store image data (e.g., image data 550 in FIGS. 5, 6A, and 6B).

According to the embodiment, the CRC generation circuit 920 can generate information about the image data stored in the image buffer 910 or CRC data for at least one partial region (e.g., 701, . . . , 724 in FIG. 7) among image data. The CRC data can be generated through redundancy data and polynomial operations, and various known CRC calculation methods can be applied. For example, the CRC calculation method can be performed through an XOR operation between the number of CRC generation bits (n) and the original data using Divisor (n+1) obtained through a preset polynomial. According to the embodiments, the CRC transmission circuit 940 can transmit CRC data 811 and 812 for the generated partial region through an I2C communication line (803 in FIG. 8A).

Although not shown, the data transmission device according to the embodiment can comprise a frame data generation circuit. The frame data generation circuit can be connected between the image buffer 910 and the frame data transmission circuit 930.

The frame data generation circuit can generate data of a frame (500 in FIG. 5 or 600 in FIGS. 6A and 6B) comprising image data stored in the image buffer 910. For example, the frame data generation circuit can generate data corresponding to the frame 500 or 600 based on the horizontal synchronization signal (HSYNC) and the vertical synchronization signal (VSYNC).

Meanwhile, the frame data transmission circuit 930 can transmit data of the frame 500 or 600 generated in the frame data generation circuit through an eDP interface (330 in FIG. 3, for example, a main transmission line).

Figure 10:
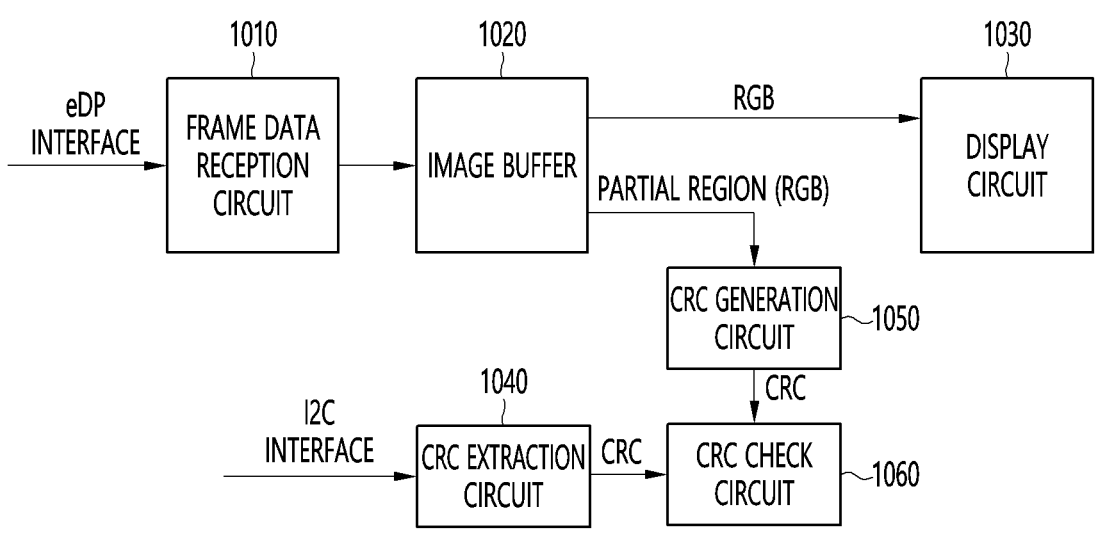
FIG. 10 is a circuit diagram of a data reception device according to an embodiment.

FIG. 10 is a circuit diagram of a data reception device according to an embodiment.

Referring to FIG. 10, a data receiving device (e.g., a display driving device) according to an embodiment can comprise a frame data reception circuit 1010, an image buffer 1020, a display circuit 1030, a CRC extraction circuit 1040, a CRC generation circuit 1050, a CRC check circuit 1060, etc.

According to the embodiment, the frame data reception circuit 1010 can receive frame data transmitted through the eDP interface shown in FIG. 9. The image buffer 1020 can extract image data (550 in FIGS. 5, 6A, and 6B) from the frame data constituting the frame 600 and store the extracted image data. The image data 550 stored in the image buffer 1020 can be transmitted to the display circuit 1030. The display circuit 1030 can convert digital image data 550 into an analog signal and then supply the converted analog signal, that is, the data voltage (Vp in FIG. 1) to each pixel (e.g., subpixel). According to the embodiment, the CRC extraction circuit 1040 can extract address information corresponding to each partial region and CRC data corresponding to each partial region from data transmitted through the I2C communication line (803 in FIG. 8A) as described above.

According to the embodiments, the CRC generation circuit 1050 can generate first CRC data from image data stored in the image buffer 1020 or data corresponding to each partial region of the image data. The CRC check circuit 1060 can compare the CRC data area 828 confirmed by the CRC extraction circuit 1040 with the first CRC data generated by the CRC generation circuit 1050 to determine whether there is an error in the corresponding partial region. According to the embodiment, if it is determined that an error has occurred in a specific partial region as a result of the determination of the CRC check circuit 1060, retransmission of image data is requested to the display processing device, or the user is notified of the error through the displayed screen.

Figure 11:
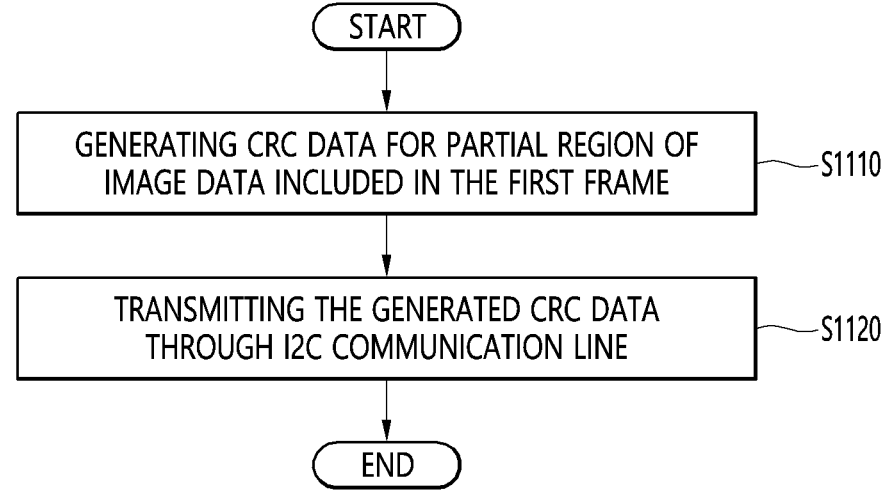
FIG. 11 is a flowchart of a data transmission method according to an embodiment.

FIG. 11 is a flowchart of a data transmission method according to an embodiment.

Referring to FIGS. 1 and 11, according to the embodiment, the data processing device 140 can generate CRC data for each partial region among regions of image data included in a first frame (S1110).

According to the embodiments, the data processing device 140 can transmit CRC data generated for each partial region through a second communication line (e.g., I2C communication line) (S1120). At this time, the image data included in the first frame can be transmitted through a first communication line (e.g., main link).

FIG. 12 is a circuit diagram of an image data inspection method according to an embodiment.

Referring to FIGS. 1 and 12, according to the embodiment, the data driving device 120 can receive data of a first frame from the data processing device 140 through a first communication line (e.g., main link) (S1210).

According to the embodiments, the data driving device 120 can generate first CRC data for a first partial region among regions of the image data included in the first frame (S1220).

According to the embodiment, the data driving device 120 can check CRC data corresponding to the first partial region received through the second communication line (e.g., I2C communication line) (S1230).

According to the embodiment, the data driving device 120 can compare the CRC data corresponding to the received first partial region with the generated first CRC data (S1240). According to the embodiments, the data driving device 120 can determine whether there is an error in the first partial region based on the comparison result (S1250).

According to the embodiments, errors in data in important areas among information displayed on a display (e.g., vehicle display) can be checked. According to the embodiments, CRC data for data in important areas among information displayed on a display (e.g., vehicle display) can be selectively transmitted through a separate communication line (e.g., I2C communication line).

What is claimed is:

1. A data transmission method of a display processing device, comprising:

generating cyclic redundancy check (CRC) data for a first partial region of regions of image data included in a first frame;

transmitting data of the first frame through a first communication line; and transmitting address information corresponding to the first partial region and the CRC data for the first partial region through a second communication line, wherein the first communication line comprises a main link transmission line configured to transmit data based on an embedded Display Port (eDP) communication protocol.

2. The data transmission method of claim 1, wherein the second communication line comprises an I2C communication line.

3. The data transmission method of claim 1, wherein the CRC data is generated in subpixel units for the first partial region.

4. The data transmission method of claim 1, wherein the CRC data is transmitted at set intervals of frames.

5. The data transmission method of claim 1, wherein the CRC data is transmitted at a time of transmitting data of a second frame.

6. The data transmission method of claim 1, wherein the first partial region comprises an image corresponding to a state of a vehicle.

7. The data transmission method of claim 1, further comprising:

generating CRC data for each of a plurality of partial regions among the regions of the image data included in the first frame; and sequentially transmitting the CRC data for the each of the plurality of partial regions for each partial region.

8. A method for inspecting image data of a display driving device, comprising:

receiving data of a first frame through a first communication line;

receiving cyclic redundancy check (CRC) data for a first partial region among regions of image data included in the first frame and address information corresponding to the first partial region through a second communication line;

generating first CRC data for the first partial region included in the received CRC data of the first frame; and determining whether there is an error in the first partial region based on a comparison result between the generated first CRC data and the received CRC data, wherein the first communication line comprises a main link transmission line congifured to transmit data based on an embedded Display Port (eDP) communication protocol.

9. The method of claim 8, wherein the second communication line comprises an I2C communication line.

10. The method of claim 8, wherein the CRC data is generated in subpixel units for the first partial region.

11. The method of claim 8, wherein the CRC data is transmitted at set intervals of frames.

12. The method of claim 8, wherein the CRC data is transmitted at a time of transmitting data of a second frame.

13. The method of claim 8, wherein the first partial region comprises an image corresponding to a state of a vehicle.

14. A display processing device, comprising:

a frame data transmission circuit configured to transmit data of a first frame through a first communication line;

a cyclic redundancy check (CRC) generation circuit configured to generate CRC data for a first partial region among regions of image data included in the first frame; and a CRC transmission circuit configured to transmit address information corresponding to the first partial region and the CRC data for the first partial region through a second communication line, wherein the first communication line comprises a main link transmission line configured to transmit data based on an embedded Display Port (eDP) communication protocol.

15. The display processing device of claim 14, wherein the second communication line comprises an I2C communication line.

16. The display processing device of claim 14, wherein the CRC data is generated in subpixel units for the first partial region.

17. The display processing device of claim 14, wherein the CRC data is transmitted at set intervals of frames.

18. The display processing device of claim 14, wherein the CRC generation circuit is configured to generate CRC data for each of a plurality of partial regions among the regions of image data included in the first frame, and the CRC transmission circuit is configured to sequentially transmit the CRC data for the each of the plurality of partial regions for each partial region.

* * * * *